United States Patent
Caputo et al.

(10) Patent No.: US 9,779,272 B2
(45) Date of Patent: Oct. 3, 2017

(54) EXTENDED USE OF LOGARITHM AND EXPONENT INSTRUCTIONS

(71) Applicant: ANALOG DEVICES, INC., Norwood, MA (US)

(72) Inventors: Timothy J. Caputo, Newton, MA (US); Donald F. Porges, Watertown, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 217 days.

(21) Appl. No.: 14/685,978

(22) Filed: Apr. 14, 2015

(65) Prior Publication Data

US 2016/0307004 A1    Oct. 20, 2016

(51) Int. Cl.
   *G06F 7/544* (2006.01)
   *G06G 7/26* (2006.01)
   *G06F 7/523* (2006.01)

(52) U.S. Cl.
   CPC ............ *G06G 7/26* (2013.01); *G06F 7/5235* (2013.01)

(58) Field of Classification Search
   None
   See application file for complete search history.

(56) References Cited

U.S. PATENT DOCUMENTS 6,480,873 B1 * 11/2002 Inoue ............... G06F 7/556
                                            708/512
8,990,278 B1 * 3/2015 Clegg ............... G06F 7/544
                                            708/272
2005/0273481 A1 * 12/2005 Dent ............... G06F 7/556
                                            708/277
2008/0243985 A1   10/2008 Tang et al.
2012/0203814 A1   8/2012 Jennings et al.
2013/0262540 A1 * 10/2013 Arnold ............. G06F 7/544
                                            708/235
2016/0077803 A1 * 3/2016 Zhong .............. G06F 7/544
                                            708/190
2016/0307004 A1 * 10/2016 Caputo ............. G06F 7/00

OTHER PUBLICATIONS

International Search Report and Written Opinion issued in International Application Serial No. PCT/US2016/0206093 mailed Aug. 1, 2016, 8 pages.
"Logarithm", Wikipedia, www.en.wikipedia/wiki/Logarithm, 20 pages.

* cited by examiner

*Primary Examiner* — David H Malzahn
(74) *Attorney, Agent, or Firm* — Patent Capital Group

(57) ABSTRACT

Embodiments of the present disclosure are based on a recognition that some processors are configured with instructions to compute logarithms and exponents (i.e. some processors include log and exp circuits). Embodiments of the present disclosure are further based on an insight that the use of the existing log and exp circuits could be extended to compute certain other functions by using the existing log and exp circuits to transform from a Cartesian to a logarithmic domain and vice versa and performing the actual computations of the functions in the logarithmic domain, which may be computationally easier than performing the computations in the Cartesian domain.

19 Claims, 6 Drawing Sheets

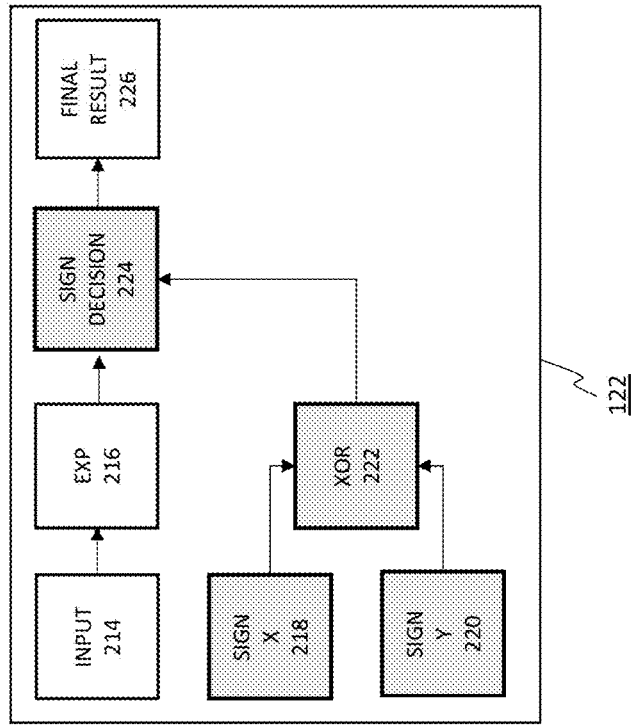
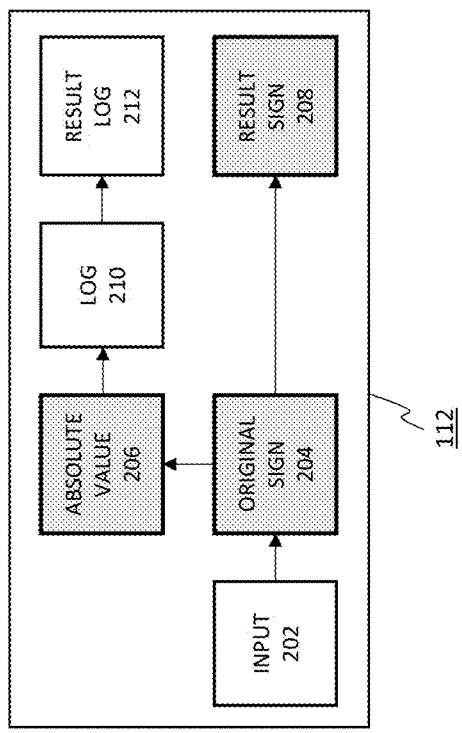
FIGURE 2B
FIGURE 2A

EXTENDED USE OF LOGARITHM AND EXPONENT INSTRUCTIONS

TECHNICAL FIELD OF THE DISCLOSURE

The present invention relates to computer processing techniques, in particular to systems and methods for computing various functions of one or more input variables.

BACKGROUND

Configuring processors with instructions to compute various functions, from multiplication and division to nonlinear functions such as e.g. square roots, reciprocals, and reciprocal square roots, is not a trivial task. What is needed in the art are systems and methods that improve on this task.

OVERVIEW

One aspect of the present invention provides an apparatus for computing a nonlinear function of an input variable (X). The apparatus includes a logarithmic (log) circuit configured to compute a logarithm of a first input value and a reciprocal circuit configured to obtain (e.g. access in a shared memory that may be accessible by both the log circuit and the reciprocal circuit, or receive from the log circuit) the computed logarithm of the first input value. The reciprocal circuit is configured to, when enabled, negate the logarithm of the first input value and provide the negated logarithm of the first input value as an output of the reciprocal circuit, and, when disabled, provide the logarithm of the first input value as the output of the reciprocal circuit. The apparatus further includes a root circuit configured to obtain (e.g. access in a shared memory that may be accessible by both the reciprocal circuit and the root circuit, or receive from the root circuit) the output of the reciprocal circuit and configured to, when enabled, divide the received output of the reciprocal circuit by N and provide the divided output of the reciprocal circuit as an output of the root circuit, and, when disabled, provide the received output of the reciprocal circuit as the output of the root circuit. The apparatus further includes a control logic configured to enable the reciprocal circuit and disable the root circuit when the nonlinear function is a reciprocal, disable the reciprocal circuit and enable the root circuit when the nonlinear function is a Nth root (e.g. when N=2, the function is a square root; when N=3, the function is a cubed root, etc.), and enable the reciprocal circuit and enable the root circuit when the nonlinear function is a reciprocal Nth root.

As is clear from present disclosure, circuits referred to herein as "reciprocal circuit" and "root circuit" or "square root circuit" do not actually perform the reciprocal and root or square root computations as understood in a Cartesian domain, but are configured to modify values in the logarithmic domain in a way that correspond to the desired function in the Cartesian domain.

A corresponding method for computing a nonlinear function of an input variable is also disclosed. The method includes instructing a logarithmic circuit to compute a logarithm of a first input value, and instructing a reciprocal circuit to obtain the logarithm of the first input value and to perform, when enabled, negate the logarithm of the first input value and provide the negated logarithm of the first input value as an output of the reciprocal circuit, and, when disabled, provide the logarithm of the first input value as the output of the reciprocal circuit. The method further includes instructing a root circuit to obtain the output of the reciprocal circuit and to perform, when enabled, divide the received output of the reciprocal circuit by 2 and provide the divided output of the reciprocal circuit as an output of the root circuit, and, when disabled, provide the received output of the reciprocal circuit as the output of the root circuit. The method also includes enabling the reciprocal circuit and disabling the root circuit when the nonlinear function is a reciprocal, disabling the reciprocal circuit and enabling the root circuit when the nonlinear function is an Nth root, and enabling the reciprocal circuit and enabling the root circuit when the nonlinear function is a reciprocal Nth root.

According to another aspect of the present disclosure, an apparatus for computing an Nth root of an input variable is provided. The apparatus includes a logarithmic circuit configured to compute a logarithm of a first input value, a root circuit configured to divide the logarithm of the first input value by N and provide the divided logarithm as an output of the root circuit, and an exponential circuit configured to compute an exponent of the output of the root circuit.

According to still another aspect of the present disclosure, an apparatus for computing a reciprocal of an input variable is provided. The apparatus includes a logarithmic circuit configured to compute a logarithm of a first input value; a reciprocal circuit configured to negate the logarithm of the first input value and provide the negated logarithm of the first input value as an output of the reciprocal circuit; and an exponential circuit configured to compute an exponent of the output of the reciprocal circuit.

In some embodiments of the various aspects described above, the apparatus may further include an absolute value circuit configured to compute an absolute value of the input variable, store a sign of the input variable, and provide the computed absolute value to the logarithmic circuit as the first input value. In such embodiments, the exponential circuit may further be configured to combine the computed exponent with the stored sign of the input variable.

According to yet another aspect of the present disclosure, an apparatus for performing a multiplication of two input variables is provided. The apparatus includes an absolute value circuit configured to compute an absolute value of a first input variable and determine (and possibly store) a sign of the first input variable, and compute an absolute value of a second input variable and determine (and possibly store) a sign of the second input variable, a logarithmic circuit configured to compute a logarithm of the absolute value of the first input variable and to compute a logarithm of the absolute value of the second input variable, a multiplication circuit configured to compute a sum by adding the logarithm of the absolute value of the first input variable to the logarithm of the absolute value of the second input variable and provide the sum as an output of the multiplication circuit, an XOR circuit configured to perform an XOR operation on Boolean values representing the sign of the first input variable and the sign of the second input variable, and an exponential circuit configured to compute an exponent of the output of the multiplication circuit and to combine the exponent with an outcome of the XOR operation on the Boolean values representing the sign of the first input variable and the sign of the second input variable.

According to yet another aspect of the present disclosure, an apparatus for performing a division of two input variables is provided. The apparatus includes an absolute value circuit configured to compute an absolute value of a first input variable and determine (and possibly store) a sign of the first input variable, and compute an absolute value of a second input variable and determine (and possibly store) a sign of the second input variable, a logarithmic circuit configured to compute a logarithm of the absolute value of the first input variable and to compute a logarithm of the absolute value of the second input variable, a division circuit configured to compute a difference by subtracting the logarithm of the absolute value of the second input variable from the logarithm of the absolute value of the first input variable and provide the difference as an output of the division circuit, an XOR circuit configured to perform an XOR operation on Boolean values representing the sign of the first input variable and the sign of the second input variable, and an exponential circuit configured to compute an exponent of the output of the division circuit and to combine the exponent with an outcome of the XOR operation on the Boolean values representing the sign of the first input variable and the sign of the second input variable.

Other aspects of the present disclosure relate to methods performed by an apparatus or enabling an apparatus according to any one of the aspects described herein to carry out its functionality, as well as to computer programs and computer-readable storage medium, preferably non-transitory, comprising instructions for carrying out such methods.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2A is a diagram illustrating an extended log circuit configured to be used in performing multiplication and division, according to some embodiments of the present invention;

FIG. 2B is a diagram illustrating an extended exp circuit configured to be used in performing multiplication and division, according to some embodiments of the present invention;

DESCRIPTION OF EXAMPLE EMBODIMENTS OF THE DISCLOSURE

Figure 1:
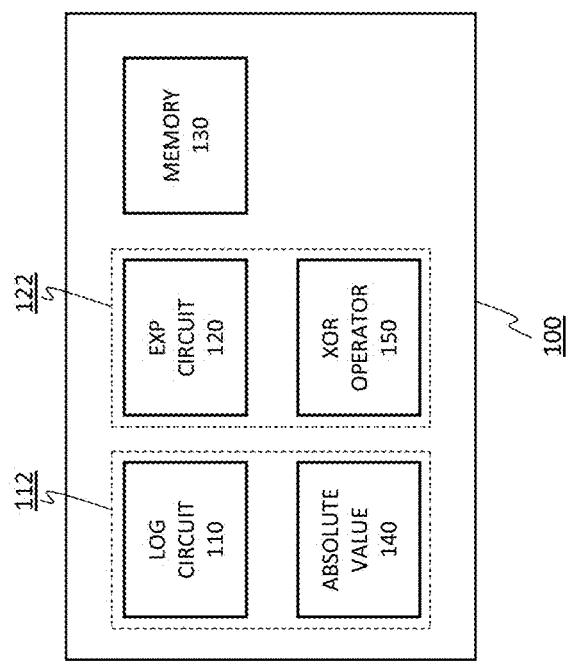
FIG. 1 is a diagram illustrating a system configured to perform multiplication and division, according to some embodiments of the present invention.

Embodiments of the present disclosure are based on a recognition that some processors are configured with instructions to compute logarithms and exponents, for example with log 2 and exp 2 instructions which could be used e.g. for the purpose of greater dynamic range when representing numbers between 0 and 1. Processor instructions to compute logarithms and exponents are referred to in the following as "log circuits" and "exp circuits," respectively. Embodiments of the present disclosure are further based on an insight that the use of the existing log and exp circuits could be extended to compute certain other functions by using the existing log and exp circuits to transform from a Cartesian to a logarithmic domain and vice versa and performing the actual computations of the functions in the logarithmic domain because doing so may be computationally easier than performing the computations in the Cartesian domain.

Such an approach may be useful for functions such as division and multiplication, in case the processor does not have multiplication or division instructions, because multiplication and division in a Cartesian domain translates to simple addition and subtraction in a logarithmic domain, as illustrated by the following equations:

$$(xy) = \exp_b(\log_b(x) + \log_b(y)) \quad (1)$$

$$(x/y) = \exp_b(\log_b(x) - \log_b(y)) \quad (2)$$

However, logarithmic computations can only work on positive inputs, which prevents the straightforward use of this approach for many applications where computations need to be performed with negative inputs or where it is not known ahead of time whether the input will be positive or negative.

Such an approach may also be useful for computing nonlinear functions such as square root, reciprocal, and reciprocal square root, because computation of such functions may also be made easier and more efficient in the logarithmic domain, as illustrated by the following equations:

$$\sqrt{x} = \exp_b\left(\frac{1}{2} * \log_b(x)\right) \quad (3)$$

$$\frac{1}{x} = \exp_b(-(\log_b(x))) \quad (4)$$

$$\frac{1}{\sqrt{x}} = \exp_b((-(\log_2(x)) \gg 1) \quad (5)$$

Therefore, it would be desirable to extend the functionality of the existing log and exp circuits to calculate other nonlinear functions, in particular reciprocals (e.g. inverse), square root, and inverse square root.

Performing Computations in the Logarithmic Domain on any Non-zero Number

FIG. 1 is a diagram illustrating a system 100 configured to perform multiplication and division, according to some embodiments of the present invention. As shown, the system 100 includes a log circuit 110 for performing computation of a logarithm to a certain base on an input value received by the circuit, an exp circuit 120 for performing computation of an exponent to a certain base on an input value received by the circuit, and a memory 130 for e.g. storing input values, results of intermediate computations, and/or final results. The memory 130 could comprise any memory such as, but not limited to, hardware registers, cache memory, system memory, processors state condition codes, external storage, or any other types of available destinations for processor instructions.

In addition, the system 100 further includes an absolute value circuit 140, i.e. instructions for computing an absolute value of an input value received by this circuit and storing the sign of the original input value, e.g. in the memory 130. Further, the system 100 also includes an XOR operator circuit 150, i.e. instructions for performing an XOR operation on two or more Boolean inputs received by this circuit.

In an embodiment, the absolute value 140 could be implemented by extending the functionality of existing log circuit 110 (shown in FIG. 1 with a dashed box 112 surrounding the log circuit 110 and the absolute value 140) by adding the ability to perform the absolute value function on a number prior to putting that value through the existing log circuit. The log circuit 110 could then be configured to write the original sign and the computed log of the absolute value to processor registers. Additionally or alternatively, in an embodiment, the XOR operator 150 could be implemented by extending the functionality of existing exp circuit 120 (shown in FIG. 1 with a dashed box 122 surrounding the exp circuit 120 and the XOR operator 150) by adding the ability to perform the XOR operation and applying the correct sign to the final output of multiplication or division. Such extended log and exp circuits 112 and 122 are shown in FIGS. 2A and 2B, respectively.

Figure 3:
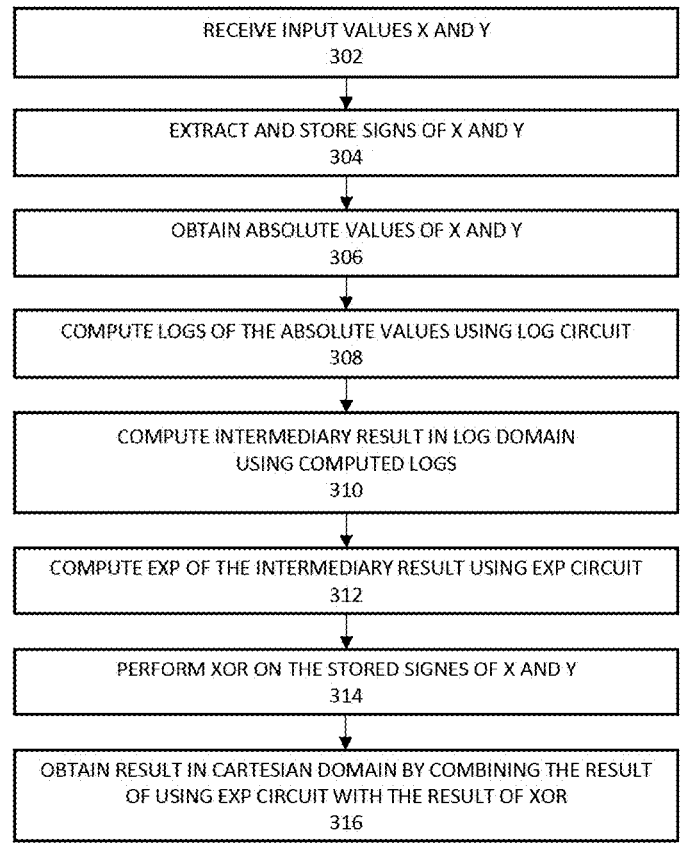
FIG. 3 is a flow diagram of method steps illustrating use of the system of FIG. 1 and/or extended circuits of FIGS. 2A and/or 2B to perform multiplication and division, according to some embodiments of the present invention.

Operation of the system 100 is further illustrated in FIG. 3.

FIG. 3 is a flow diagram 300 of method steps illustrating use of the system of FIG. 1 to perform multiplication and division, according to some embodiments of the present invention. While FIG. 3 is described with reference to the system of FIG. 1, any system configured to perform steps illustrated in FIG. 3, in any order, is within a scope of the present disclosure.

The method 300 may begin in step 302, where the system 100 receives input values X and Y to compute either multiplication or a division operation on them. To that end, in an embodiment, the extended log circuit 112 may be called with each input value (shown as "input 202" in FIG. 2A) taken from the memory 130, e.g. from a respective processor register (or, if performed sequentially for two input values, from the same input value processor register).

In step 304, the sign of the input value X is extracted (shown as "original sign 204" in FIG. 2A) and is written to the memory 130 (shown as "result sign 208" in FIG. 2A), e.g. to a processor register designated for that purpose, and, in step 306, the absolute value operation is performed on the input value (shown as "absolute value 206" in FIG. 2A). Steps 304 and 306 may be performed either by the extended log circuit 112, as indicated above with references to FIG. 2A, or by the absolute value circuit 140. Preferably, the signs of X and Y are stored as Boolean values—e.g. "0" indicating a positive value and "1" indicating a negative value.

In step 308, the original log circuit is called with the absolute value computed in step 306 (shown as "log 210" in FIG. 2A). The output of the log circuit is written to the memory 130, e.g. to a processor register designated for that purpose (shown as "result log 212" in FIG. 2A).

Steps 304-308 are performed for the input value Y as well.

When the method 300 proceeds to step 310, logarithmic values for X and Y have been computed. In step 310, the system 100 performs computation of an intermediary result in the logarithmic domain using the logarithmic values for X and Y obtained in step 308. If the desired operation is multiplication X*Y, then in step 310 the system 100 adds the logarithmic values for X and Y in accordance with equation (1). If the desired operation is division X/Y, then in step 310 the system 100 subtracts the logarithmic value of Y from that of X in accordance with equation (2).

In step 312, the exp circuit 120 computes the exponent of the intermediary result computed in step 310.

In step 314, the XOR operator 150 performs XOR operation on the stored signs of X and Y. If e.g. "0" was stored to indicate a positive value and "1" was stored to indicate a negative value, then the outcome of XOR operator 150 would be "0" if either both X and Y were positive or both X and Y were negative, and would be "1" if one of X and Y was positive and the other one was negative.

In step 316, the result in the Cartesian domain is obtained by combining the result of using the exp circuit in step 312 with the result of the XOR operation in step 314.

In one embodiment, steps 312-316 could be performed by the system 100.

In an embodiment where steps 312-316 are performed by the extended exp circuit 122, these steps may include calling the extended instruction 122 with the value taken from the memory (e.g. processor register) containing the output of the add/subtract of step 310 (shown as "input 214" in FIG. 2B). The original exp circuit may then be used to calculate the output in Cartesian format, as shown with "exp 216" in FIG. 2B. XOR is performed (shown as "XOR 222" in FIG. 2B) on the values in the two registers (shown as "sign X 218" and "sign Y 220" in FIG. 2B) that contain the original sign values that were stored in step 304. The result of 222 is then used to select (shown as "sign decision 224" in FIG. 2B) whether the result of 216, or a negated version of that result, is provided as a result of the multiplication/division (shown as "final result 226" in FIG. 2B), e.g. written as the output to a processor register.

In FIGS. 2A and 2B, grey shading and thicker lining is used to illustrate functionality that is added to the conventional log and exp circuits, respectively, to arrive at the extended log and exp circuits illustrated in these FIGUREs. Thus, in FIG. 2A, elements 204, 206, and 208 are added, while in FIG. 2B, elements 218, 220, 222, and 224 are added.

While functionality of the extended log and exp circuits illustrated in FIGS. 2A and 2B was described with reference to multiplication and division (i.e. two input values), these circuits, with modifications as would be apparent to a person skilled in the art, could also be used to perform operations in the logarithmic domain on any negative input value.

Figure 4:
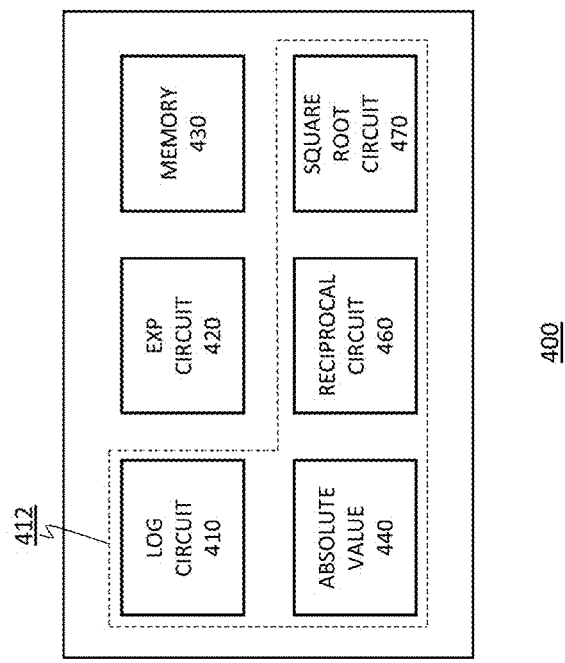
FIG. 4 is a diagram illustrating a system configured to perform reciprocal, square root, and/or reciprocal square root calculations, according to some embodiments of the present invention.

Extending Functionality of Existing Log and Exp Circuits to Compute Other Nonlinear Functions FIG. 4 is a diagram illustrating a system 400 configured to perform reciprocal, square root, and/or reciprocal square root calculations, according to some embodiments of the present invention. As shown, the system 400 includes a log circuit 410 for performing computation of a logarithm to a certain base on an input value received by the circuit, an exp circuit 420 for performing computation of an exponent to a certain base on an input value received by the circuit, and a memory 430 for e.g. storing input values, results of intermediate computations, and/or final results. Discussions provided for the memory 130 are applicable to the memory 430 and, in the interests of brevity, are not repeated.

In addition, the system 400 further includes an absolute value circuit 440, i.e. instructions for computing an absolute value of an input value received by this circuit and storing the sign of the original input value, e.g. in the memory 430. Further, the system 400 may also include a reciprocal circuit 460, i.e. instructions for performing a reciprocal operation on an input received by this circuit and/or a square root circuit 470, i.e. instructions for performing a square root operation on an input received by this circuit. In the following, unless specified otherwise, the system 400 is described to have the functionality to both compute reciprocals and square roots (by including, respectively, circuits 460 and 470). However, in various embodiments, the system 400 may include only one of these circuits, e.g. only the reciprocal circuit 460 or only the square root circuit 470.

In an embodiment, the absolute value 440 and one or both of the reciprocal circuit 460 and the square root circuit 470 could be implemented by extending the functionality of existing log circuit 410 (shown in FIG. 4 with a dashed box 412 surrounding the log circuit 410, the absolute value 440, the reciprocal circuit 460, and the square root circuit 470) by adding the ability to perform the absolute value function on an input value prior to putting that value through the reciprocal and/or square root circuits. Such extended log circuits 412 is shown in FIG. 5.

Figure 5:
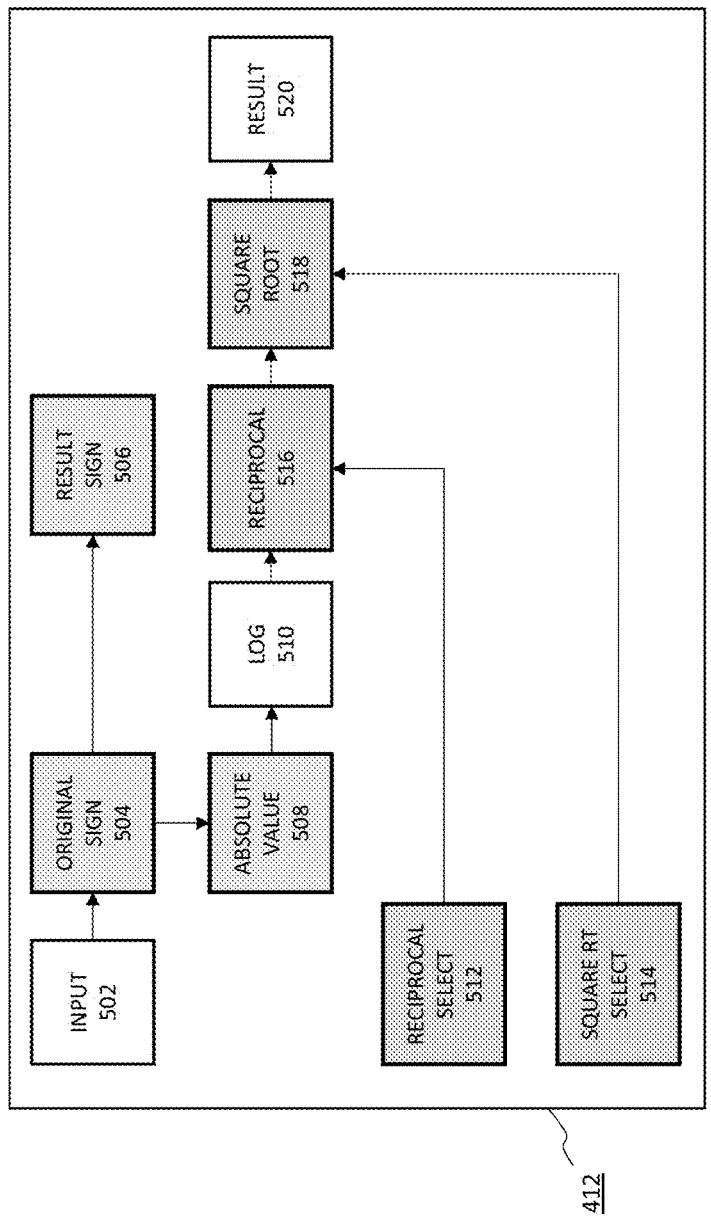
FIG. 5 is a diagram illustrating an extended log circuit configured to be used in performing reciprocal, square root, and/or reciprocal square root calculations, according to some embodiments of the present invention.

As shown in FIG. 5, extra functionality to be added to the existing log instruction could be to modify the output the existing log circuit, divide the log result by 2 for square root and/or negate the result for reciprocal selected by the operation code ("opcode"). After that, once the extended log instruction is complete, the exp instruction can be executed to bring the result back to the Cartesian domain. The output of the exp instruction will be the result of the function specified by the log instruction's opcode. The sign for the output could be decided by the stored sign of the original input value, similar to the manner described above.

Turning to FIG. 5 in greater detail, as shown, input value X (shown as "input 502" in FIG. 5) is used to extract and store the original sign of the input value (shown, respectively, as "original sign 504" and "result sign 506" in FIG. 5). The absolute value of the input value X is then computed (shown as "absolute value 508" in FIG. 5). The absolute value of X is passed to the existing log circuit, such as e.g. log circuit 410 (shown as "log 510" in FIG. 5), which converts the absolute value of the input value X to the logarithmic domain.

In case both the reciprocal circuit 460 and the square root circuit 470 are implemented, a SELECT functionality may be implemented by a control logic (not shown in FIGUREs) configured to provide a select signal indicating which calculation is to be performed on the input value in the logarithmic domain (i.e. on the output of the log 510). A RECIPROCAL SELECT signal could be used to indicate that reciprocal of X is to be computed (shown as "reciprocal select 512" in FIG. 5), while a SQUARE ROOT SELECT signal could be used to indicate that square root of X is to be computed (shown as "square root select 514" in FIG. 5). Both RECIPROCAL SELECT and SQUARE ROOT SELECT signals could be used to indicate that reciprocal square root of X is to be computed. A person skilled in the art can envision other implementations of a control logic configured to enable and disable respective circuits, all of which are within the scope of the present disclosure.

The output of the log 510 is passed to the reciprocal circuit 460, where, in presence of reciprocal select signal 512 a reciprocal of X is calculated (shown as "reciprocal 516" in FIG. 5), which, in the logarithmic domain, reduces to negating the value received from the log 510, in accordance with equation (4). The output of the reciprocal circuit 460 is then passed to the square root circuit 470, where, in presence of square root select signal 514 a square root of the value passed to the circuit 470 is calculated (shown as "square root 518" in FIG. 5), which, in the logarithmic domain, reduces to dividing the received value by 2, in accordance with equation (5). The result of the computation of a desired nonlinear function in the logarithmic domain may then be written to the memory 430, e.g. to a processor register calculated (shown as "result 520" in FIG. 5).

In FIG. 5, grey shading and thicker lining is used to illustrate functionality that is added to the conventional log circuit to arrive at the extended log circuit illustrated in this FIGURE. Thus, in FIG. 5, elements 504, 506, 508, 512, 514, 516, and 518 are added.

Figure 6:
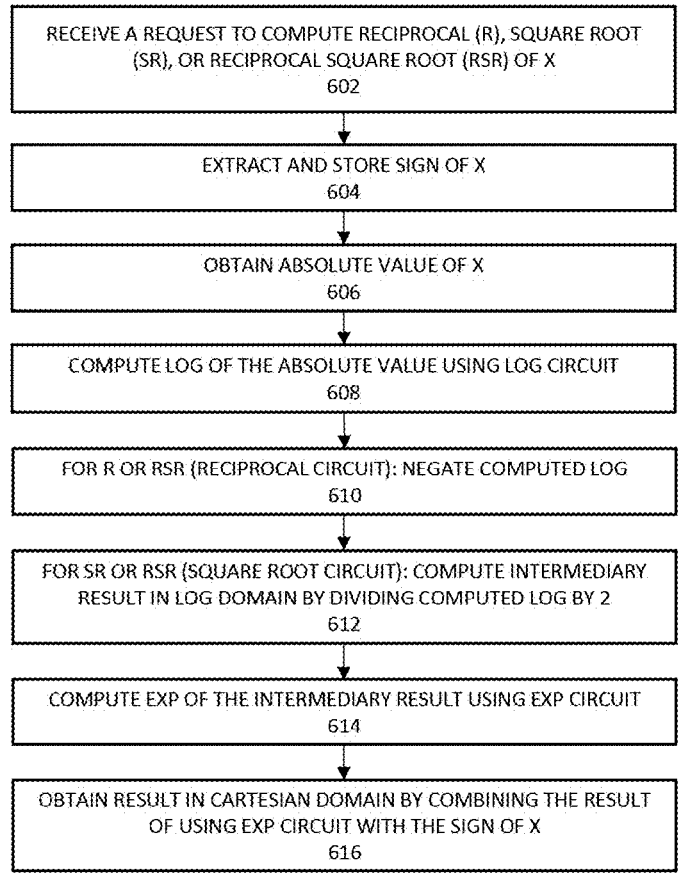
FIG. 6 is a flow diagram of method steps illustrating use of the system of FIG. 4 and/or the extended log circuit of FIG. 5 to perform reciprocal, square root, and/or reciprocal square root calculations, according to some embodiments of the present invention.

Operation of the system 400, possibly implemented with the extended circuit of FIG. 5, is further illustrated in FIG. 6.

FIG. 6 is a flow diagram 600 of method steps illustrating use of the system of FIG. 4 to perform reciprocal, square root, and/or reciprocal square root calculations, according to some embodiments of the present invention. While FIG. 6 is described with reference to the system of FIG. 4, any system configured to perform steps illustrated in FIG. 6, in any order, is within a scope of the present disclosure.

The method 600 may begin in step 602, where the system 600 receives a request to calculate reciprocal, square root, or a reciprocal square root on an input value X. To that end, in an embodiment, the extended log circuit 412 may be called with the input 502 taken from the memory 430, e.g. from a processor register.

Steps 604, 606, and 608, performed on the input value X are analogous to steps 304, 306, and 308 described above (but now only for one input value) and, therefore, in the interests of brevity, the description of these steps is not repeated here.

When the method 600 proceeds to step 610, logarithmic value for X has been computed. In step 610, if the nonlinear function to be computed on the input value X is reciprocal (i.e. reciprocal select signal is present, square root select signal is absent) or reciprocal square root (i.e. both reciprocal select signal and square root select signal are present), the system 400 performs computation of an intermediary reciprocal result in the logarithmic domain using the logarithmic value for X obtained in step 608 by negating the value obtained in step 608.

If the nonlinear function to be computed on the input value X is only the square root of X (i.e. reciprocal select signal is absent, square root select signal is present), then step 610 is skipped and the output of step 608 is provided to the square root circuit, step 612.

In step 612, if the nonlinear function to be computed on the input value X is square root, the system 400 performs computation of an intermediary square root result in the logarithmic domain by right-shifting the logarithmic value for X obtained in step 608 (i.e. reciprocal select signal is absent, square root select signal is present). Alternatively, if, in step 612, the nonlinear function to be computed on the input value X is reciprocal square root, the system 400 performs computation of an intermediary reciprocal square root result in the logarithmic domain by right-shifting the logarithmic value obtained in step 610 (i.e. both reciprocal select signal and square root select signal are present).

In step 614, the exp circuit 420 computes the exponent of the intermediary result computed either in step 610 or 612, depending on which nonlinear function is to be computed.

In step 614, the final result for performing the desired nonlinear function may be combined with the stored sign of X and the output of the exp step 614. In one embodiment, if the original request (step 602) indicated that a square root of a negative value was to be computed, then step 614 could include outputting an indication, e.g. as a flag, that the result is an imaginary number.

Variations and Implementations

While embodiments of the present invention were described above with references to exemplary implementations as shown in FIGS. 1-6, a person skilled in the art will realize that the various teachings described above are applicable to a large variety of other implementations. For example, the general teachings described herein are applicable to both floating point and fixed point instructions, with the differences in each particular implementation being apparent to a person skilled in the art. In another example, while the teachings provided herein referred specifically to a square root computation, the element referred to as the square root circuit could be configured to compute any Nth root of an input value by dividing the logarithm of the received input value by N (e.g. by dividing by 3 instead of two when the root is a cubed root, etc.)

In certain contexts, the features discussed herein can be applicable to automotive systems, medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions.

In the discussions of the embodiments above, components of a system, such as e.g. clocks, multiplexers, buffers, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

Parts of various systems for extending functionality of existing log and exp circuits can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described herein by executing one or more instructions stored on a non-transitory computer readable storage medium.

In one example embodiment, any number of electrical circuits of FIGS. 1-6 may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of FIGS. 1-6 may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the functionalities of extended log and exp circuits may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of FIGS. 1-6 may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of FIGS. 1-6 and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to extending functionality of existing log and exp circuits illustrate only some of the possible functions that may be executed by, or within, system illustrated in FIGS. 1-6. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Note that all optional features of the apparatus described above may also be implemented with respect to the method or process described herein and specifics in the examples may be used anywhere in one or more embodiments.

Although the claims are presented in single dependency format in the style used before the USPTO, it should be understood that any claim can depend on and be combined with any preceding claim of the same type unless that is clearly technically infeasible.

What is claimed is:

1. An apparatus for computing a nonlinear function of an input variable, the apparatus comprising:
    a logarithmic circuit configured to compute a logarithm of a first input value, wherein the first input value is an absolute value of the input variable;
    a reciprocal circuit configured to obtain the logarithm of the first input value and configured to:
        when enabled, negate the logarithm of the first input value and provide the negated logarithm of the first input value as an output of the reciprocal circuit, and
        when disabled, provide the logarithm of the first input value as the output of the reciprocal circuit;
    a root circuit configured to obtain the output of the reciprocal circuit and configured to:
        when enabled, divide the output of the reciprocal circuit by N and provide the divided output of the reciprocal circuit as an output of the root circuit, and
        when disabled, provide the output of the reciprocal circuit as the output of the root circuit; and
    a control logic configured to perform one or more of:
        enable the reciprocal circuit and disable the root circuit when the nonlinear function is a reciprocal,
        disable the reciprocal circuit and enable the root circuit when the nonlinear function is an Nth root, and
        enable the reciprocal circuit and enable the root circuit when the nonlinear function is a reciprocal Nth root.

2. The apparatus according to claim 1, further comprising: an exponential circuit configured to compute an exponent of the output of the root circuit.

3. The apparatus according to claim 1, further comprising: an absolute value circuit configured to compute the absolute value of the input variable, store a sign of the input variable, and provide the computed absolute value to the logarithmic circuit as the first input value.

4. The apparatus according to claim 3, further comprising: an exponential circuit configured to compute an exponent of the output of the root circuit and to combine the computed exponent with the stored sign of the input variable.

5. The apparatus according to claim 1, wherein the first input value is a floating point value.

6. The apparatus according to claim 1, wherein the first input value is a fixed point value.

7. The apparatus according to claim 1, wherein the apparatus is implemented in an application specific integrated circuit (ASIC), a programmable gate array (PGA), or a digital signal processor (DSP).

8. A non-transitory computer readable storage medium storing one or more computer readable instructions which, when executed on a processor, configure the processor to carry out a method for computing a nonlinear function of an input variable, the method comprising:
    instructing a logarithmic circuit to compute a logarithm of a first input value, wherein the first input value is an absolute value of the input variable;
    instructing a reciprocal circuit to perform:
        when enabled, negate the logarithm of the first input value and provide the negated logarithm of the first input value as an output of the reciprocal circuit, and
        when disabled, provide the logarithm of the first input value as the output of the reciprocal circuit;
    instructing a root circuit to perform:
        when enabled, divide the output of the reciprocal circuit by 2 and provide the divided output of the reciprocal circuit as an output of the root circuit, and
        when disabled, provide the output of the reciprocal circuit as the output of the root circuit; and
    performing one or more of:
        enabling the reciprocal circuit and disabling the root circuit when the nonlinear function is a reciprocal,
        disabling the reciprocal circuit and enabling the root circuit when the nonlinear function is a Nth root, and
        enabling the reciprocal circuit and enabling the root circuit when the nonlinear function is a reciprocal Nth root.

9. The non-transitory computer readable storage medium according to claim 8, wherein the method further comprises instructing an exponential circuit to compute an exponent of the output of the root circuit.

10. The non-transitory computer readable storage medium according to claim 8, wherein the method further comprises instructing an absolute value circuit to compute the absolute value of the input variable; storing a sign of the input variable; and providing the computed absolute value to the logarithmic circuit as the first input value.

11. The non-transitory computer readable storage medium according to claim 10, wherein the method further comprises instructing an exponential circuit to compute an exponent of the output of the root circuit; and combining the computed exponent with the stored sign of the input variable.

12. The non-transitory computer readable storage medium according to claim 8, wherein the first input value is a floating point value.

13. The non-transitory computer readable storage medium according to claim 8, wherein the first input value is a fixed point value.

14. A method for computing a nonlinear function of an input variable, the method comprising:
performing one or more of:
when the nonlinear function is a reciprocal, enabling a reciprocal circuit and disabling a root circuit,
when the nonlinear function is a Nth root, disabling the reciprocal circuit and enabling the root circuit, and
when the nonlinear function is a reciprocal Nth root, enabling the reciprocal circuit and enabling the root circuit;
using a logarithmic circuit to compute a logarithm of a first input value, wherein the first input value is an absolute value of the input variable;
when the reciprocal circuit is enabled, using the reciprocal circuit to negate the logarithm of the first input value and provide the negated logarithm of the first input value as an output of the reciprocal circuit;
when the reciprocal circuit is disabled, providing the logarithm of the first input value as the output of the reciprocal circuit;
when the root circuit is enabled, using the root circuit to divide the output of the reciprocal circuit by 2 and provide the divided output of the reciprocal circuit as an output of the root circuit; and
when the root circuit is disabled, providing the output of the reciprocal circuit as the output of the root circuit.

15. The method according to claim 14, further comprising using an exponential circuit to compute an exponent of the output of the root circuit.

16. The method according to claim 14, further comprising:
using an absolute value circuit to compute the absolute value of the input variable;
storing a sign of the input variable; and
providing the computed absolute value to the logarithmic circuit as the first input value.

17. The method according to claim 16, further comprising:
using an exponential circuit to compute an exponent of the output of the root circuit; and
combining the computed exponent with the stored sign of the input variable.

18. The method according to claim 14, wherein the first input value is a floating point value.

19. The method according to claim 14, wherein the first input value is a fixed point value.

* * * * *